(No Model.) 2 Sheets—Sheet 1.

J. LELAND.
MACHINE FOR CUTTING OPENINGS IN WINDOW JAMBS.

No. 358,463. Patented Mar. 1, 1887.

WITNESSES:

INVENTOR:
Joseph Leland,
by John C. Dewey.
Attorney.

(No Model.) 2 Sheets—Sheet 2.

J. LELAND.
MACHINE FOR CUTTING OPENINGS IN WINDOW JAMBS.

No. 358,463. Patented Mar. 1, 1887.

WITNESSES:
Chas. T. Schmelz
Fred. W. Smith

INVENTOR:
Joseph Leland,
by John C. Dewey,
Attorney.

UNITED STATES PATENT OFFICE.

JOSEPH LELAND, OF WORCESTER, MASSACHUSETTS.

MACHINE FOR CUTTING OPENINGS IN WINDOW-JAMBS.

SPECIFICATION forming part of Letters Patent No. 358,463, dated March 1, 1887.

Application filed September 22, 1886. Serial No. 214,224. (No model.)

*To all whom it may concern:*

Be it known that I, JOSEPH LELAND, a citizen of the United States, residing at Worcester, in the county of Worcester and State of Massachusetts, have invented certain new and useful Improvements in Machines for Cutting Openings into the Weight-Pockets of Window-Frames; and I do hereby declare that the following is a full, clear, and exact description thereof, which, in connection with the drawings making a part of this specification, will enable others skilled in the art to which my invention belongs to make and use the same.

My invention relates to an automatic machine or apparatus designed for cutting out at a single operation the longitudinal openings in the lower part of window-jambs, communicating with the weight-pockets formed in the window-frame, and by means of which openings the weights for supporting the window-sashes are inserted into said pockets and access is obtained to said weights for any purpose.

Heretofore it has always been customary to cut out these openings by means of circular saws cutting with the grain of the wood to cut out the sides of the openings, and a keyhole saw or chisel cutting against the grain of the wood to cut out the ends of the openings. This method has required separate operations, it not being possible to cut out the sides and ends of the openings at one operation. By my machine or apparatus the said opening is made in the window-jamb at one operation, and is so made that the piece cut out can be used as a cover to fit into and close up said opening after the weight is inserted in its receiving-pocket.

Figure 1:
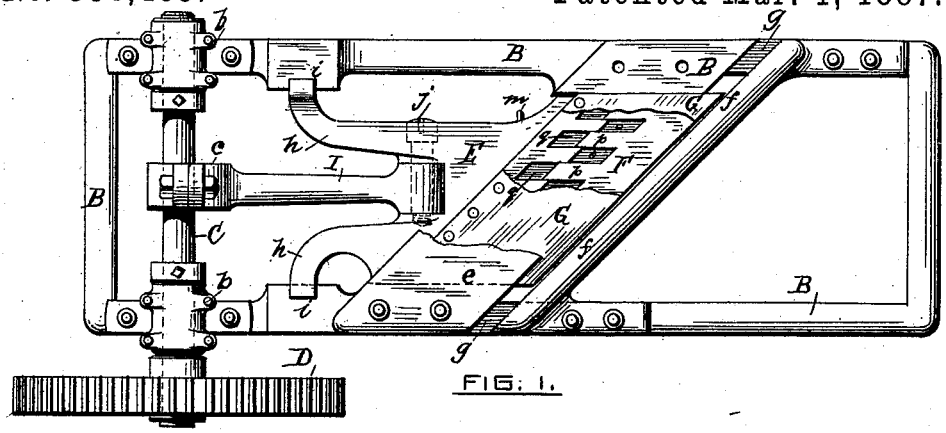
Figure 2:
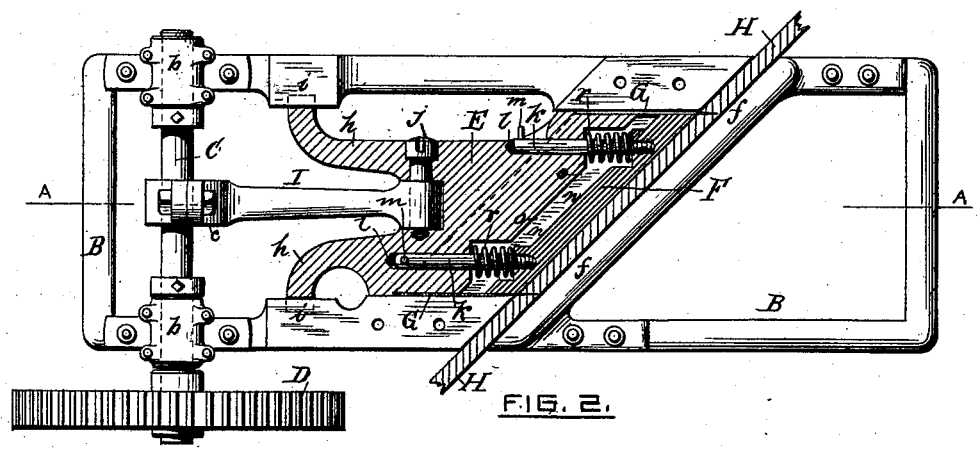
Figure 3:
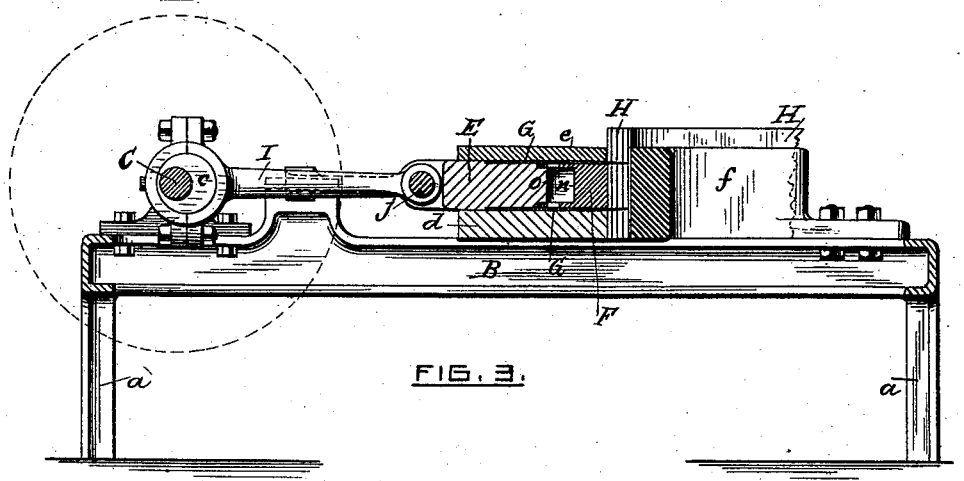
Figure 4:
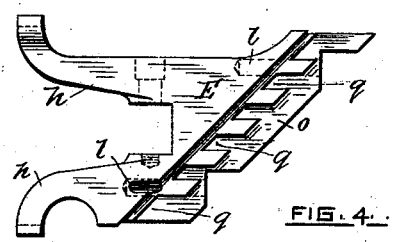
Figure 5:
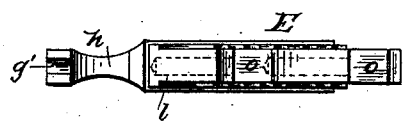

Referring to the drawings, Figure 1 represents a plan view of my machine, a portion of the cutter being broken away. Fig. 2 is a central horizontal section through the cutter-head, follower, and cutter, (shown in Fig. 1,) the other parts being shown in elevation, a section of the window-jamb to be cut out being shown in this figure. Fig. 3 is a central longitudinal section on line A A, Fig. 2. Figs. 4, 5, 6, and 7 show detail views of the cutter-head and follower detached from each other, Figs. 4 and 5 being plan and side views, respectively, of the cutter-head, and Figs. 6 and 7 plan and side views, respectively, of the movable follower, to be hereinafter fully described.

In the accompanying drawings, the part marked B is the frame for supporting my apparatus. It is preferably made of cast metal, and provided with legs $a$ $a$. At one end there are bearings $b$ $b$, in which the driving-shaft C revolves. Said shaft C has a driving-gear, D, secured upon one end and an eccentric disk, $c$, at its middle point.

Diagonally across the central part of the frame B extends the bed or support $d$, upon which the cutter-head E, carrying the follower F and the cutter G, is supported and moves back and forth. A corresponding cross-piece, $e$, extends over the bed $d$ to keep the cutter-head E down upon the bed $d$. A block, $f$, extends diagonally across the bed-plate B, and is secured to said bed-plate at a short distance from the bed $d$, so as to leave a sufficient space or opening, $g$, for the window-jamb H to be inserted in and held during the operation of cutting the opening therein by the forward movement of the cutter G.

The cutter-head E is in this instance supported at its rear end by means of two curved arms, $h$ $h$, made with slots $g'$ in their ends, (see Figs. 4 and 5,) which fit onto projecting ways $i$ $i$, formed upon the top of the bed-plate B. (See Fig. 1.) An eccentric-rod, I, pivoted at one end by means of a bolt, $j$, to the cutter-head E, and connected at the other end with the eccentric $c$ on the driving-shaft C, causes the cutter-head E to move back and forth as the shaft C revolves.

Upon the cutter-head E, at its outer end, is supported and secured in any suitable manner, in this instance by bolts $r$ passing through the cutter-head E, (see Fig. 1,) the cutter G, said cutter having four cutting-edges to cut at one operation a four-sided opening in the window-jamb H. It will be readily understood that the cutter G fits over and incloses the four sides of the cutter-head E at its outer end, the shape of the cutter-head E corresponding with the shape of the cutter.

The cutter G is made of very thin metal, and preferably in one piece, with a knife or cutting-edge upon its outer exposed end. (See Figs. 2 and 3.) As the cutter is made of very thin metal, so as to enter the wood more easily, it will bend and turn as it is forced into the window-jamb and lose its shape, unless it is properly supported at every point upon its interior surface, as well as upon its exterior surface. In order to accomplish this I have devised what I call the "movable follower" F, which is fitted into the outer end of the cutter G, and connected with the cutter-head E by means of pins or rods $k\ k$, secured in the inner end of the follower F, and moving back and forth in the holes $l$ made in the outer end of the cutter-head E. Knobs or projections $m$ on the ends of said pins $k\ k$ prevent them from being drawn out and disconnected from the cutter-head E.

Figure 6:
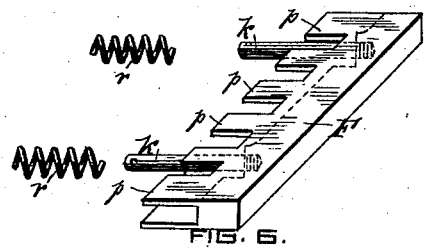
Figure 7:
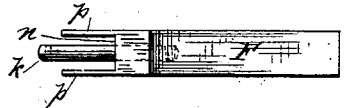

The interior of the follower F is cut out at its inner end, $n$, as shown in Figs. 6 and 7, to admit of the end $o$ of the cutter-head E entering therein, and projections or guides, as $p$, are formed upon the inner edge of the follower F, adapted to engage and slide in corresponding recesses, as $q$, made in the cutter-head E at its outer end. Springs $r$ encircle the pins $k\ k$, and are contained within the follower F. (See Fig. 2.) Said springs have their bearings at one end against the end $o$ of the cutter-head E and at their other end against the inner end of the follower F, thus tending to force the follower F away from the end of the cutter-head E and out from the cutter G, the pins $k\ k$ moving in and out in holes $l$ made in the cutter-head E, but prevented from moving out too far, so that the outer end of the follower F will extend out beyond the cutting-edge of the cutter G, by the knobs $m$, extending out from the ends of the pins $k\ k$, as before described.

By means of the follower F, the exterior shape of which corresponds with the shape of the interior of the cutter G, in combination with the cutter-head E, over the end of which the cutter G is fitted, it will be seen that the cutter G is supported at every point upon its interior surface out as far as its cutting-edge, and that by means of the bed $d$ and cross-piece $e$ and the sides of the frame B the exterior surface of the cutter G is inclosed and supported.

The operation of my machine, from the above description in connection with the drawings, will be readily understood by those skilled in the art, and is as follows: The driving-shaft C is revolved, so that the sliding cutter-head E, upon which is secured the cutter G, and with which is connected to move back with said cutter-head the follower F, will be drawn back to its farthest limit away from the bed $d$. A window-jamb, H, is then inserted in the slot $g$, resting upon the frame B and bearing against the block $f$, so that the point at which it is desired to cut the opening in said jamb H will come directly opposite the end of the follower F and the cutter G. The driving-shaft C is now revolved, causing the cutter-head E to advance, and also the cutter G, secured thereon, and the cutting-edge of the cutter to enter the wood, as shown in Figs. 2 and 3, and cut out the opening therein. As the cutter-head E and cutter G advance, and the cutting-edge of said cutter enters the window-jamb, the outer end of the movable follower F comes in contact with the window-jamb and is forced back against the action of the springs $r$ within the cutter G, (see Fig. 2;) but as the follower F recedes the cutter G advances, and said follower serves to support the cutter upon its interior surface in connection with the cutter-head E up to the very point where it enters the wood. After the cutter-head E has advanced to the full limit of the throw of the eccentric disk $c$ on the driving-shaft C, which is sufficient to cause the cutting-edge of the cutter G to pass entirely through the window-jamb H, the continued revolution of the shaft C draws the cutter-head E and cutter G back to their original position, the action of the springs $r$ forcing the follower F away from the end of the carriage cutter-head E, so that it will constantly bear against the window-jamb and extend out as far as the exposed end of the cutter G. The window-jamb H is now removed, having the desired opening made therein at one operation by the forward movement of the cutter-head E and cutter G, as above described. The cutting-edge of the cutter G is so thin that the piece cut out of the jamb will serve to fit in and form a cover for said opening.

I prefer to construct my machine, as shown, with a diagonally-shaped cutter; but I do not limit myself to such construction.

The cutter-head E may be adjustably connected with the rod I, so as to regulate the forward movement of said cutter-head in cutting window-jambs of different thicknesses.

I do not limit myself to the special manner of connecting the cutter-head E with the driving-shaft shown in the drawings and above described, as I may do it in any other equivalent manner, and any other well-known and equivalent means for operating the cutter-head may be employed in lieu of that shown, if preferred.

Having thus described my invention, what I claim as new, and desire to secure by Letters Patent, is—

1. The combination, with cutter-head E and follower F, yieldingly connected to said cutter-head and forming a continuous supporting-wall upon the interior surface of the cutter, of a cutter, G, secured to and movable with the cutter-head, and a continuous supporting-wall upon the exterior surface of said cutter as far as its cutting-edge, substantially as set forth.

2. The combination, with the cutter-head E, provided with recesses, as $q$, and holes $l$ in its outer end for the purpose stated, and the cutter G, having four cutting-edges and supported and secured upon the outer end of the cutter-head E, of the movable follower F, adapted to fit into the outer end of the cutter G, and provided with pins $h$, springs $r$, and guides, as $p$, to engage the recesses $q$ and permit of the follower F moving back and forth upon the end of the cutter-head E within the cutter G, and furnish a continuous support for said cutter upon its interior surface, substantially as set forth.

JOSEPH LELAND.

Witnesses:
　JOHN C. DEWEY,
　FRED. W. SMITH.